United States Patent [19]
Klute

[11] Patent Number: 4,930,985
[45] Date of Patent: Jun. 5, 1990

[54] WIND POWER PLANT

[76] Inventor: Ferdinand Klute, Fixberg 6, Paderborn 4790, Fed. Rep. of Germany

[21] Appl. No.: 242,749

[22] Filed: Sep. 9, 1988

[30] Foreign Application Priority Data

Sep. 10, 1987 [DE] Fed. Rep. of Germany ....... 3730301

[51] Int. Cl.$^5$ .................................................. F03D 5/02
[52] U.S. Cl. ............................................ 416/8; 415/5
[58] Field of Search ........................... 416/7, 8; 415/5

[56] References Cited

U.S. PATENT DOCUMENTS

| | | | |
|---|---|---|---|
| 131,494 | 9/1872 | Bisbee | 416/8 |
| 1,058,950 | 4/1913 | Dreier | 416/8 |
| 1,062,624 | 5/1913 | Wendt | 416/8 |
| 1,187,601 | 6/1916 | Blackmore | 416/7 |
| 1,451,298 | 4/1923 | Greth | 416/8 |
| 3,957,390 | 5/1976 | Miller | 415/5 |
| 4,093,398 | 6/1978 | Miller | 415/5 X |
| 4,552,507 | 11/1985 | Klute | 415/5 |

FOREIGN PATENT DOCUMENTS

| | | | |
|---|---|---|---|
| 248109 | 12/1987 | European Pat. Off. | 415/5 |
| 2418660 | 10/1975 | Fed. Rep. of Germany | 415/5 |
| 413493 | 8/1910 | France | 416/8 |
| 863458 | 4/1941 | France | 416/8 |
| 2539460 | 7/1984 | France | 415/5 |
| 2551141 | 3/1985 | France | 415/5 |
| 1164456 | 6/1985 | U.S.S.R. | 416/8 |
| 1182195 | 9/1985 | U.S.S.R. | 416/7 |
| 1372096 | 2/1988 | U.S.S.R. | 415/5 |
| 859007 | 1/1961 | United Kingdom | 416/8 |

Primary Examiner—Everette A. Powell, Jr.
Attorney, Agent, or Firm—Marvin E. Jacobs

[57] ABSTRACT

In a wind power plant having wind surfaces which are moved by air currents and coupled to a generator and are guided in longitudinal frames so as to be staggered one behind the other and are pivotally connected to lateral pulling devices and supported by endless lateral circulation rails, wherein the plant is mounted on a rotatable support plate, an arrangement and construction are provided in which, simultaneously, the wind surfaces are approximately perpendicular in the upper run of the pulling device and horizontal in the lower run and a number of wind surfaces at both ends of the longitudinal frame are in the reverse position. An additional horizontal guide strut may be disposed in the top region of each wind surface, the outwardly projecting ends of which guide strut engage an outer guide bar which, having a larger diameter, is secured to the longitudinal frame at a specific distance from the inner guide groove.

5 Claims, 10 Drawing Sheets

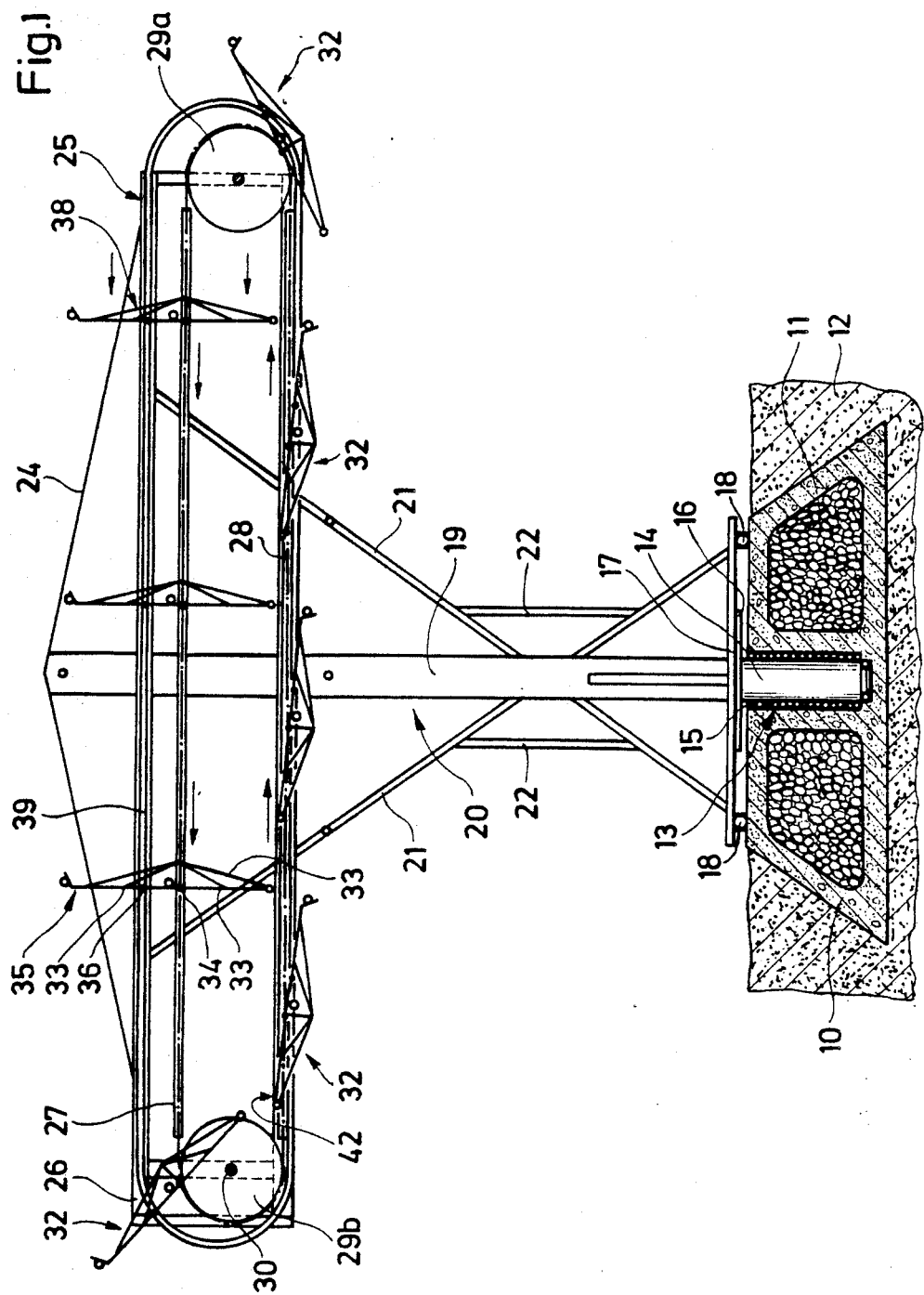

WIND POWER PLANT

FIELD OF THE INVENTION

The invention relates to a wind power plant having wind surfaces which are moved by air currents and which are coupled to a generator and pivotally connected to endless, horizontal pulling devices.

BACKGROUND OF THE INVENTION

The disadvantage of the using wind turbines, provided with a plurality of rotor blades, as wind power plants, resides in the fact that, for reasons of stability, the rotor blades which are exposed to the airflow have relatively small, tilted surfaces and hence can only utilize a small portion of the air-flow (quantity) available, and, moreover, the air disadvantageously does not strike the rotor blades at right angles but at an acute or obtuse angle.

Since there is also a continuous change of direction between the direction of the airflow and the position of the rotor blades when a rotor system is in operation, the efficiency is relatively low compared with the quantity of air flowing past.

OBJECT OF THE INVENTION

The object of the invention is to provide a rotor-free wind power plant having large pressure surfaces, in which, under forced guidance, the wind surfaces as pressure surfaces alternately change their position with the wind on the one hand and against the wind on the other hand during their movement, in order to offer optimally utilized wind surfaces to the airflow.

SUMMARY OF THE INVENTION

In accordance with the invention, in a wind power plant of the type specified, this object is achieved in that simultaneously the wind surfaces in the upper run of the pulling device are approximately perpendicular and those in the lower run of the pulling device are positioned horizontally and a number of wind surfaces at both ends of a supporting longitudinal frame are in the reverse position.

In this wind power plant set up in the direction of the wind, the perpendicular wind surfaces move under wind pressure in a direction up to a guide pulley. During circulation on the lower run of the pulling devices, the wind surfaces are positioned horizontally during forward movement up to the front guide pulley in order to reduce their wind resistance.

The wind surfaces are lifted to a perpendicular position again in the region of the front guide pulley, so that the wind pressure acts continuously and successively on the wind surfaces and hence moves the pulling devices to which a generator is coupled.

In a preferred embodiment, the pulling devices running parallel on both sides are guided around front guide pulleys and around rear guide pulleys, and a generator is coupled to the power shaft interconnecting the said guide pulleys.

In a further preferred embodiment, each wind surface is equipped with a surrounding outer frame in which a sail or vane made from textile fabric, plastics film, or the like, is stretched.

Each wind surface preferably has an additional horizontal transverse holding strut whose outwardly projecting ends engage lateral, closed guide grooves which correspond to the run of the endless pulling device and which can be secured to a longitudinal frame.

Preferably, an additional horizontal guide strut is disposed in the top region of each wind surface and its outwardly projecting ends engage an outer guide bar which, having a larger diameter, may be secured to a longitudinal frame at a specific distance from the inner guide groove.

In order to tilt a wind surface from the top perpendicular position into a bottom horizontal position, the spacing of the outer guide bar decreases in the outer region of the guide pulleys and approaches the bottom region of the guide groove.

With a large-area wind power plant of this type, it is possible to catch the air currents over a large area, so that the energy of the air currents can be converted to electrical energy by the generator.

The invention is to be applied to the individual features as well as combinations thereof.

In a further preferred embodiment, a larger, lower guide pulley and a smaller, upper guide pulley offset relative thereto are provided to improve the change of position of the moving wind surfaces.

In the case of the rear guide pulleys, the wind surfaces are tilted through 267° during their passage through two turns or are turned in such a way that they lie almost horizontal with a single slope of approximately 3° in the lower run of the pulling device, and hence offer only a slight resistance to the airflows during the forward movement towards the front operating point.

The wind surfaces are raised into the perpendicular position again in the region of the front guide pulleys, as a result of the distances between the circulation grooves and the guide grooves varying during circulation.

After covering the horizontal distance in the lower run of the system, each wind surface turns through a further 93° at the front, larger guide pulleys and the smaller guide pulleys located at a specific distance thereabove. Hence the wind surface has turned through 360° during one circulation. The wind surfaces are then in a perpendicular position, so that the wind pressure continuously and successively acts upon these wind surfaces disposed in a longitudinal direction and moving parallel on the same plane one behind the other and adjacent to one another, and hence moves the pulling devices which, by way of the rear guide pulleys, drive a common power shaft to one end of which is connected a compensating flywheel on the outside and to the other end of which is connected a generator outside the longitudinal member.

In a further preferred embodiment of a wind power plant having a plurality of tracks, all the fixed and movable parts on all the tracks are identical.

The distance between the inner circulation rail and the outer guide groove in the upper run of the wind power plant, including the front and rear drops, is equal to the distance between the pulling- and guide lugs on the outer frame of the wind surface.

This distance is fully cancelled in the case of the lower tangents of the front and rear guide pulleys where the guide groove is located directly below the inner circulation rail in the lower run of the wind power plant. Hard rubber rollers may be mounted on the outer ends of the guide lugs. When in the operating state, the guide lugs on both sides always hold the wind surface in the desired position in conjunction with the correspondingly disposed guide bars.

A transverse baffle may be disposed on each track of the entire plant between the rear guide pulleys. The baffle serves as a wind vane on the one hand and, on the other hand, it assists the tilting of the wind surface at the rear end of the track by urging the wind surface upwardly by deflecting the airflow to the bottom rear half of the wind surface, wherein the two halves of the wind surface pass in rapid succession through the lee of the transverse baffle favourable to the rotation.

To improve the manner in which the airflows also reach the wind surfaces which are each located perpendicularly in the lee of the one in front, the wind surfaces may be sub-divided into a plurality of perpendicular segment surfaces and, staggered rearwardly in groups of three, secured to a segment frame. The rearward staggering of the second and third segment surface within a group creates air passages in which the velocity of the flow quantities is substantially increased and thereby enhances the thrust performance on the perpendicular segment surfaces in this region.

BRIEF DESCRIPTION OF THE DRAWINGS.

Embodiments of the invention are illustrated in the drawings, in which:

FIG. 1 is a side elevation of a wind power plant, having wind surfaces pivotally connected to pulling devices, on a mast which is pivotable into the direction of the wind;

FIG. 4a is a vertical fragmentary section through a side region of a base with overlapping platform;

FIG. 4b is a side elevation of a biassing spring.

FIGS. 7, 7a and 7b are diagrammatic perspective views of a sail surface with staggered segment surfaces and air passages in accordance with FIGS. 5 and 6.

FIG. 8a is a diagrammatic plan view of an air passage with angled sail surfaces;

Figure 1A:
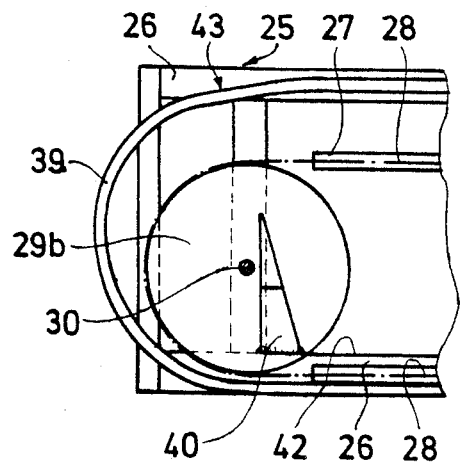
FIG. 1a is a fragmentary side elevation, drawn to an enlarged scale, of an end region of the guides, disposed in a longitudinal frame, of the pulling device, with guide pulley and a transverse baffle.

DESCRIPTION OF PREFERRED EMBODIMENTS.

A concrete frame base 10 is filled with a heavy filling material 11 for stability and is located in solid ground 12.

A perpendicular bearing bush 13 is fitted in the centre of the conrete frame base 10, and a support pin 14 is rotatably mounted in the bearing bush 13 by means of a ball bearing 15.

The support pin 14 carries a horizontal support plate 16 on which a horizontal platform 17 rests. The underside of the periphery of the platform 17 is rotatably mounted on the surface of the concrete frame base 10 by means of bearing rollers 18.

Two perpendicular masts 19 are located opposite one another on the platform 17 and form a frame 20 which is supported by means of diagonal struts 21 and/or perpendicular support struts 22.

The two perpendicular masts 19 are additionally interconnected by means of transverse members 23 at the top end and in the centre region to form the perpendicular frame 20.

A suspension cable 24 is secured to the top of the frame 20 having the two perpendicular masts 19. A longitudinal frame 25 is suspended from the cable 24 and is additionally secured between the masts 19.

The spread suspension cable 24 is secured to each outer end of an upper longitudinal member 26 of the longitudinal frame 25, so that the cantilever longitudinal frame 25, supported only in its central region, is suspended in the manner of a rope bridge.

Each of the two lateral longitudinal members 26 of the longitudinal frame 25 has a lateral guide groove 27 in which is located an endlesssly circulating pulling device such as chain 28, rope, belt or the like, which runs around a respective front and a respective rear guide pulley 29a, 29b which are disposed in pairs. A continuous, interconnecting power shaft 30 is mounted in the centre of the rear pair 29b of guide pulleys, one end of which shaft is mechanically connected to an external generator 31b and its other end is provided with a flywheel 31a outside the longitudinal member 26. The two front guide pulleys 29a arranged as a pair are disposed in perpendicualr struts of the longitudinal frame 25 by means of a shaft 29c and are connected to one another so as to operate in synchronism. The flywheel 31a secured to the power shaft 30 of the guide pulley 29b laterally of the longitudinal frame 25 serves to compensate for the pressure differences occurring and hence the slightly varying velocity of motion of the wind surfaces 32 described hereinafter.

Figure 2:
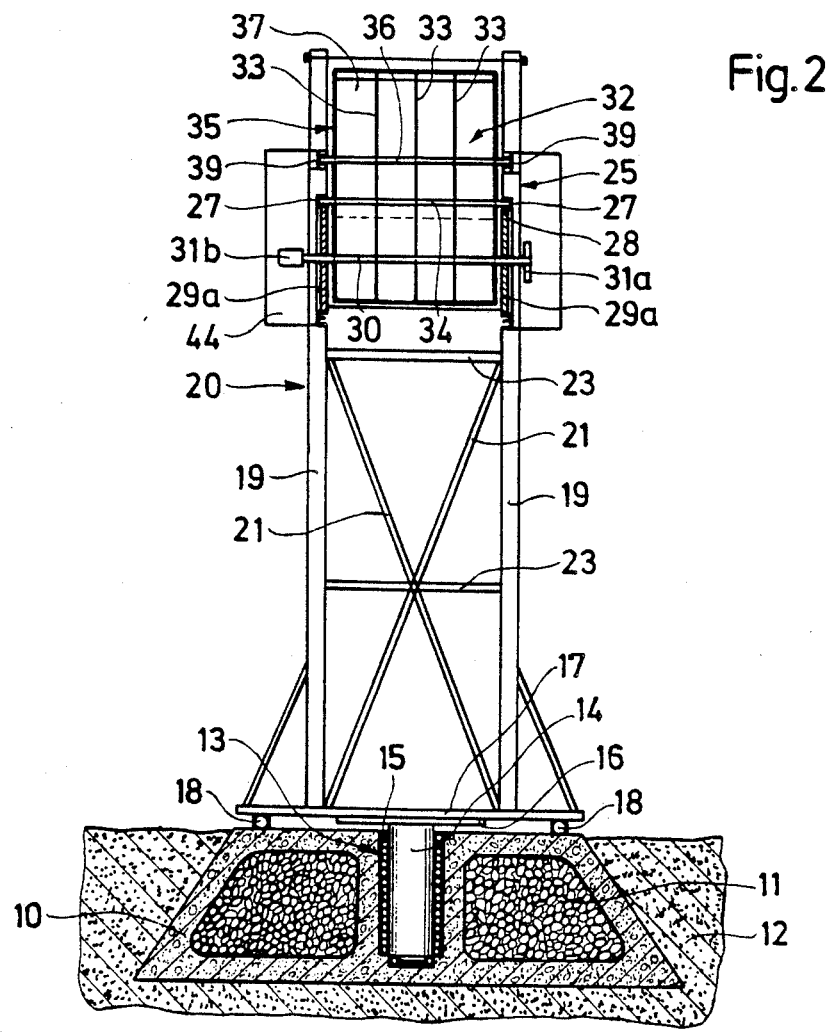
FIG. 2 is a front elevation of the same wind power plant.
Figure 3:
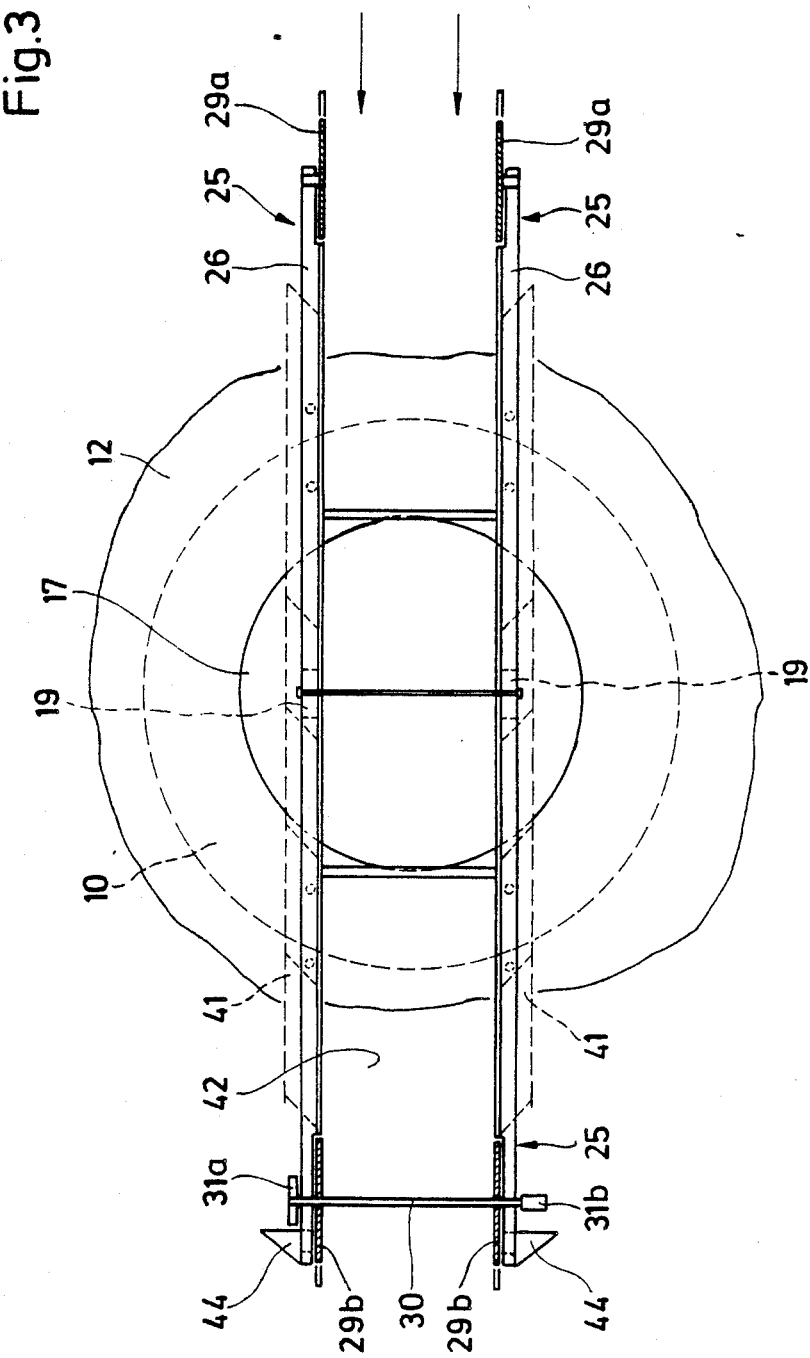
FIG. 3 is a diagrammatic plan view of the longitudinal frame of the same wind power plant on a base.

Flexible wind surfaces 32 with sails (FIGS. 1, 2) made from textile fabric or the like are pivotally connected to the pulling device, such as chains 28 or the like, at right angles thereto. Each sail is tensioned by perpendicular and horizontal support struts 33 distributed over the wind surface 32 which is held by an outer frame 35.

In order to reinforce each fabric sail 37, a tensioning device 38 made from ropes may be additionally secured on the flow pressure side and, in conjunction with the perpendicular and horizontal support struts 33 and the outer frame 35, imparts a certain flexible stability to each wind surface 32 when it is acted upon by the wind.

Each wind surface 32 is provided towards the flow side with a rear, large-mesh, light metal lattice and a textile sheet 37 or the like located in front of the lattice. All materials are weatherproof.

Each wind surface 32, which forms a partially rigid and partially flexible member by virtue of the support struts 33 and the front tensioning device 38, is pivotally connected at its centre part to the endlessly circulating chains 28 by means of a horizontal transverse holding strut 34, in such a way that each of the wind surfaces is substantially perpendicular in the upper run of the endlessly circulating chains 28, while the wind surfaces 32 tilt in the region of the rear guide pulleys 29b and are approximately horizontal in the lower run of the endless chains 28. Each wind surface 32 again assumes a perpendicular position in the region of the front guide pulleys 29a.

The top portion of each wind surface 32 is angled through 45° in the top region towards the oncoming air flow and may preferably be 1/5 longer than the bottom portion (calculated from the upper run of the chains 28).

The reversing moment of the wind surface 32 during the rear lowering and reversal is ensured by the so-called topheaviness and by the flow pressure on the angled top region of the surface, and is also enhanced by the increased drop.

Each wind surface 32 is equipped with, inter alia, a bottom horizontal transverse holding strut 34 whose ends extend beyond the perpendicular outer frames 35 and into the endless pulling devices 28 on both sides and engage therein. The transverse holding strut 34 connects the outer frame 35 of the wind surface 32 to all the perpendicular support struts 33 on the same plane. A further horizontal guide strut 36 is located above the transverse holding strut 34. The guide strut 36 also connects all the perpendicular support struts in the plane of an outer, additional guide bar 39 and extends at each end into the inwardly open groove in the guide bar.

The guide bar 39 extends above the upper run of the pulling device 28 or the guide groove 27 at a large distance therefrom and parallel thereto, and each end of the top, horizontal guide strut 36 is preferably equipped with adhesive rubber and slidingly engages a respective guide bar 39 whose distance from the other guide groove 27 located below decreases in the top region of the guide pulley 29b in a certain manner so that the wind surface 32 tilts out of its perpendicular position as it moves around the guide pulley with its top part inclined. The top part of the wind surface 32 moves to the horizontal position more rapidly than its bottom part, since the air flow has more effect on the longer, angled top part than the bottom part of the wind surface 32 and, as a result of encountering the transverse baffle 40, also raises the rear bottom region of the wind surfaces. Hence the two airflows supplement one another and assist the reversal from the perpendicular to the horizontal.

Hence, during the following reversal through 270°, the perpendicular wind surface 32 moves outwardly around the power shaft 30 and does not come into contact with the latter.

All the eight wind surfaces 32 go through the described operating sequences continuously, wherein the flywheel 31a compensates for any differences in speed which occur and which are caused by the simultaneous lowering and raising of two wind surfaces 32.

It may be preferable to construct each textile fabric sail as a roller blind which, controlled in accordance with the strength of the wind, or the like, by motors and a sensor, or the like, set to the same frequency for all the motors, can be rolled up or unrolled. They provide safety against the rigours of the weather in winter and against strong gusts of wind and hurricanes when they are rolled up and thus do not form a target for the wind.

Since the guide grooves 27 for the horizontal transverse holding struts 34 are open towards the wind surfaces 32, foreign bodies whirled up by the airflows can enter the guide grooves even at a height of 35 to 40 m from the ground. Hence, it is preferable to allow so-called scraper brushes to slide infront of the guide pulleys 29a, 29b, which scraper brushes follow in the guides grooves 27 and are secured by a support arm to the ends of the horizontal transverse holding strut 34.

FIG. 1 shows an underside, horizontal planar bottom surface 42 which covers the full area of the entire space directly below the bottom edges of the wind surfaces between the parallel bottom longitudinal members 26. Consequently, the flow of air moving between the longitudinal frames cannot escape downwardly and thus prevents disadvantageous turbulence in the region of the wind surfaces 32. The bottom surface 42 is connected to the longitudinal members 26 on both sides and thus contributes to the reinforcement of the longitudinal frame 25.

A further purpose of the bottom surface 42 is to build up an advantageous accumulation of air upstream of the bottom part of the wind surfaces 32, so that a pressure head becomes effective in addition to a dynamic pressure. In the case of smaller wind surfaces 32, the two perpendicular sides of the longitudinal frame 25 outside the longitudinal members 26 can be covered over their entire length, and also the opening between the longitudinal members 26 towards the top, so that tunnel suction is created.

Moreover, angled baffles 41 are disposed on both sides predominantly along the rear half of the longitudinal frame 25 and guide the airflows to the wind surfaces 32 and, at the same time acting as wind vanes, hold the right-hand half of the system towards the oncoming airflow.

The function of a wind power plant, illustrated in the accompanying drawings, will be described in the following.

By way of example, the wind power plant illustrated as an embodiment has a total of eight wind surfaces 32. When in the operating phase illustrated, the three wind surfaces 32 located in a perpendicular position are displaced linearly on one plane in one direction (rearwardly) by the airflows and urge the upper pulling devices, such as chains 28, on both sides rearwardly, so that the rotary movement is transmitted to the generator 31b by way of the two guide pulleys 29b and their continuous power shaft 30.

The desired positions of the wind surfaces 32 at any given time are achieved as a result of the different perpendicular and horizontal distances between the guide grooves 27 and guide bars 39 and their adjacent chains 28, or the like.

Since the top half of the rear wind surface 32 is longer, and thus heavier, than its bottom half when viewed from the upper run 28, and since the airflow presses against the wind surface angled at 45° and, owing to the increased drop 43, the top-heavy top region of the wind surface 32 tilts through 270° to the bottom horizontal return path position, since the varying distances between the inner guide grooves 27 and the outer guide bars 39 safeguard the desired positions of the wind surfaces 32.

The chain 28 extends in the guide grooves 27 provided on both sides for the horizontal transverse holding strut 34. Furthermore, the three wind surfaces 32 on the return path on the lower run of the chain 28 move in a horizontal position, that is, with a low flow resistance, back to the front operating region.

The front wind surface 32 is then raised from the horizontal into the perpendicular position as shown in FIG. 1, so that a full wind surface 32 is again available for the airflow.

In order to guide the airflow additionally in the region of the rear guide pulley 29b, a preferably sloping transverse baffle 40 is secured below the front region of the said guide pulley.

During reversal of a rear wind surface 32, the airflow from the front strikes the slope of the transverse baffle 40. When it raises the wind surface 32, the airflow is forced upwardly under the bottom rear part of the wind surface 32, lifts the latter and thereby assists the reversal of the wind surface 32, while, during further progressive rotation, the then top, lengthened part of the wind surface 32 is urged downwards once by the air-flow and, during the further course of rotation, drops in the lee of the transverse baffle 40 which thereby assists the reversal for a second time. Alternatively, the transverse baffle 40 may be a roller blind equipped with a remote-controlled motor and which can be rolled up or unrolled according to the weather.

However, the transverse baffle 40 also serves as a wind vane when the next oncoming wind surface 32 is still a substantial distance away.

The wind vanes 44 on each side are disposed on the rear left-hand end of the system on the outside and at right angles between the top and bottom horizontal longitudinal frames 25.

In this wind power plant, the airflows fully strike the wind surfaces 32 and are correspondingly utilized.

The surface of the concrete frame base 10 (see FIG. 4) forms a circular surface plate 50 whose outer rim has a circular concave track 51 in which balls are disposed. The support plate 53 with its downwardly directed support lugs 54 is mounted on the surface plate 50 or its balls.

The support plate 53 also has a circular concave track 55 which extends congruently with the concave track 51 of the surface plate 50.

The support plate 53 has a roller 69 in its angled side wall towards the side of the oncoming airflow. The roller is additionally equipped with a controllable motor (not shown) which rotates the entire plant sideways through 90° when strong winds or hurricanes occur.

Three or four masts 56 are located opposite one another on the support plate 53 and form a perpendicular frame 57 supported by diagonal struts 58 and/or perpendicular support struts 59.

The perpendicular masts 56 are additionally connected to the perpendicular frame 57 at their top ends and in their central regions by means of transverse members 60.

Several spread suspension cables 61 are disposed at the top of the frame 57. The longitudinal frames 62 are suspended from the cables 61 and are additionally secured between the masts 56.

Each spread suspension cable 61 is lashed to each outer end of an upper longitudinal member 63 of the longitudinal frame 62, so that the cantilever outer part of the longitudinal frame 62 is also held from above.

Each of the two outer longitudinal frames 62 of a respective track have an endless, circulating pulling device such as a chain 65, cable, or the like, in lateral circulation rails 94 disposed in the longitudinal members 63 and directed towards the sails. The pulling devices run over larger, front and rear guide pulleys 66 and two smaller guide pulleys 67 located at a specific distance thereabove, and are disposed in pairs.

The longitudinal frames 62 are secured to the insides of outer masts 56 and to both sides of centre masts 56, wherein the inner rails 94 located in them and outer guide grooves are open towards the sail surface 68 and receive pulling lugs 70 and guide lugs 71 by means of the pulling device 65.

The rear, larger guide pulleys 66 are mounted in their centres on a common power shaft 72 which is rigidly connected to them and on respective ends of which are mounted a generator 73 and a compensating flywheel 74 outside the two outer longitudinal members 63.

The respective larger and smaller guide pulleys 66, 67, disposed in pairs between the longitudinal frames 62 are disposed by means of a shaft 75 in perpendicular struts 76 of the longitudinal frames 62 and are interconnected for synchronous operation by way of the pulling devices 65 and a power shaft 72 common to all the guide pulleys 66, 67. The same also applies to all the movable parts of the entire wind power plant.

The compensating flywheel 74 secured externally to the longitudinal frame 62 of the power shaft 72 compensates for the pressure differences which occur upon simultaneous lowering and raising of the surfaces of the sails 68.

The sails 68 are connected to the pulling devices 65 by means of their outer frame 77 and their pulling lugs 70 on both sides. Segment frames distributed across each sail surface 68 are disposed at a predetermined angle to the sail surface 68 to which are secured three segment surfaces 80 which are staggered rearwardly and form a segment group. the rearward staggering of the individual segment surfaces 80 results in passages 81 which are formed between the mutually adjacent segment groups and in which the velocity of the airflow is increased.

By virtue of the alignment of the passages 81 towards the following sail surface 68, the airflows are guided from the front of the forward sail surface 68 to the front of the following sail surface 68 by the passages 81 themselves. It is especially the increased velocity of the flow quantities which flow in the passages 81 to each following sail surface 68 that again builds up the previous flow quantity upstream of the sail surface and eliminates the work-hindering wind pressure at the rear of the forward sail surface 68.

The sail surfaces 68 are reinforced by means of perpendicular and horizontal support struts 82 within the outer frame 77 of the sail surface 68.

For the purpose of reinforcing each sail surface 68, a tensioning device 83 made from cables may additionally be secured at the flow side and, in conjunction with the perpendicular and horizontal support struts 82 and the outer frame 77, imparts a certain resilient stability to each sail surface 68 when the wind is acting upon it.

All the materials which are used to manufacture the sail surfaces, outer frames 77, support struts 82, segment surfaces 80 etc. should be weatherproof.

Each sail surface 68 which by virtue of these support struts 82 and front tensioning device 83, forms a partially rigid and a flexible member, has an outwardly projecting pulling lug 70 on each side of its outer frame at half the height thereof, the outer ends of which lugs are hinged to pulling devices 65 disposed in circulation rails 94 on each side of the sail surface 68.

Guide lugs 71 are disposed outside on the outer frame 77 of the sail surface 68 and above the pulling lugs 70 at a distance therefrom corresponding to the distance between the circulation rail 94 and the guide bar 78 including the sharp drops at each end, the outer ends of which guide lugs carrying rollers 79 which engage the guide grooves 84 disposed on both sides.

As a result of the smaller guide pulleys 67 being disposed at more than half the height of the sail surface above the front and rear, larger guide pulleys 66, and as a result of the different distances occurring between the inner circulation rails 94 and the outer guide grooves 84 in the upper and lower runs of the system, the sail surfaces 68 pivotally connected at both sides to the pulling devices 65 are in a perpendicular position in the upper run and in a horizontal position downstream of the smaller, rear guide pulley 67. The sail surface 68 in the lower run is in a horizontal position below and between the larger guide pulleys 66 until it is again in a perpendicular position in the upper run of the system after the larger and smaller guide pulleys 66, 67 (large, small).

Hence, the distance between the inner circulation rail 94 and the outer continuous guide grooves 84 in the upper run, together with the front and rear drops, is not present in the lower run due to the lower tangents of the larger guide pulleys 66.

Here, the outer guide groove 84 is located directly below the inner circulation rail 94 and extends parallel thereto and horizontally to the front, larger guide pulley 66. In order to reach the positions described, a spring 100 is preferably fitted on each side of the sail surface 68 and is secured to a chain link and embraces the pulling lug 70, and its upwardly leading arm permanently urges the side frame of the sail surface 68 forwards in the downwind direction, or into the position determined by operation when tilting or raising the sail surface 68.

The transverse baffle 40 (see FIG. 1a) is disposed in all passages at the rear end of each track (A) between the larger guide pulleys 66 and with an upward slope in the down-wind direction.

The transverse baffle 40 is disposed in each track (A) at the top on the perpendicular transverse struts 26 or grooves on both sides between the longitudinal frames 25 in the lower run.

Figures 9, 9A, 9B:
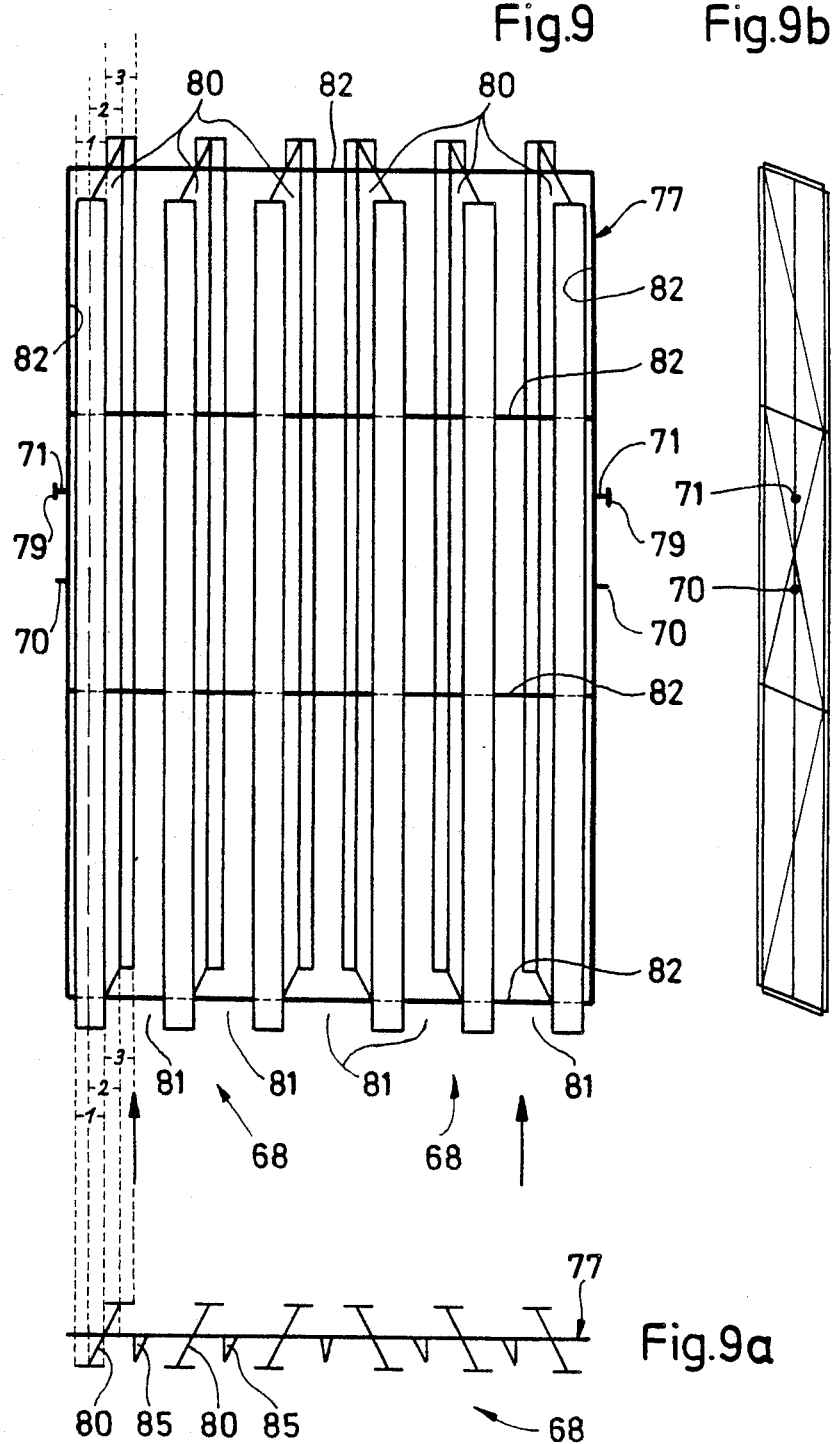
FIGS. 9, 9a and 9b are diagrammatic perspective views and a plan view of the sail surfaces divided into segments.
Figure 10:
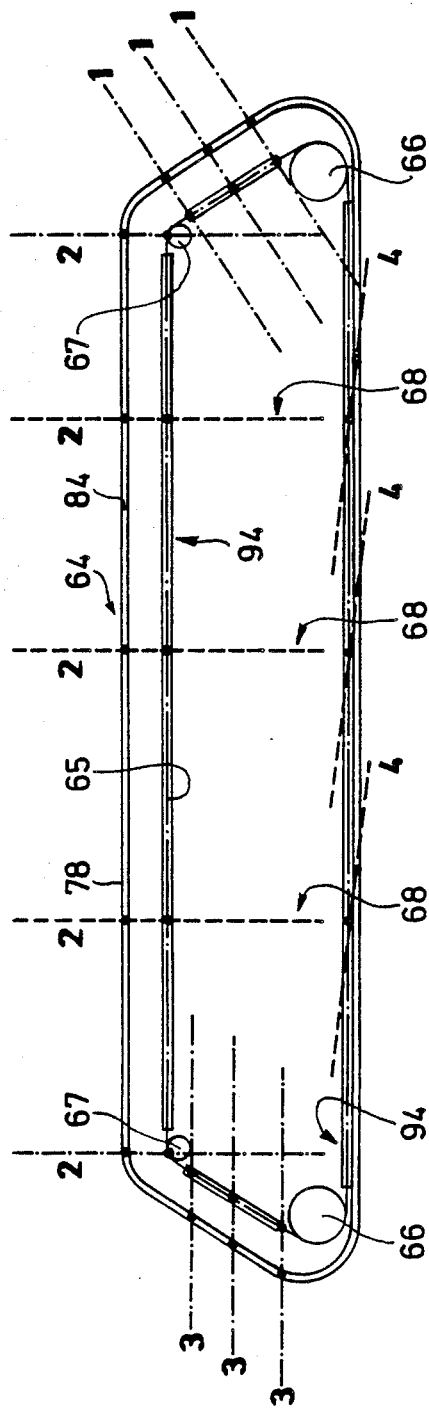
FIG. 10 is a diagrammatic illustration of a modified design with the sail surfaces in an angled position.

Double baffles 85 of wedge-shaped cross section are disposed in the centre of each track (A) and parallel to the segment frames 80 (FIG. 9a). The tips of the baffles are directed in the opposite direction to the flow of air and conduct the latter to the side of the segment frames 80 which is to be acted upon, a respective half of which segment frames is located on the left and the right in a wind surface as viewed in the direction of the wind.

Furthermore, oblique baffles 40 (FIG. 1a) are disposed on both sides predominantly along the left-hand rear half of the outer longitudinal frame 62 and conduct the outer airflow quantities to the adjacent sail surfaces 68 and at the same time serve as wind vanes to hold the right-hand front half of the wind power plant to face the oncoming airflow.

Figure 4:
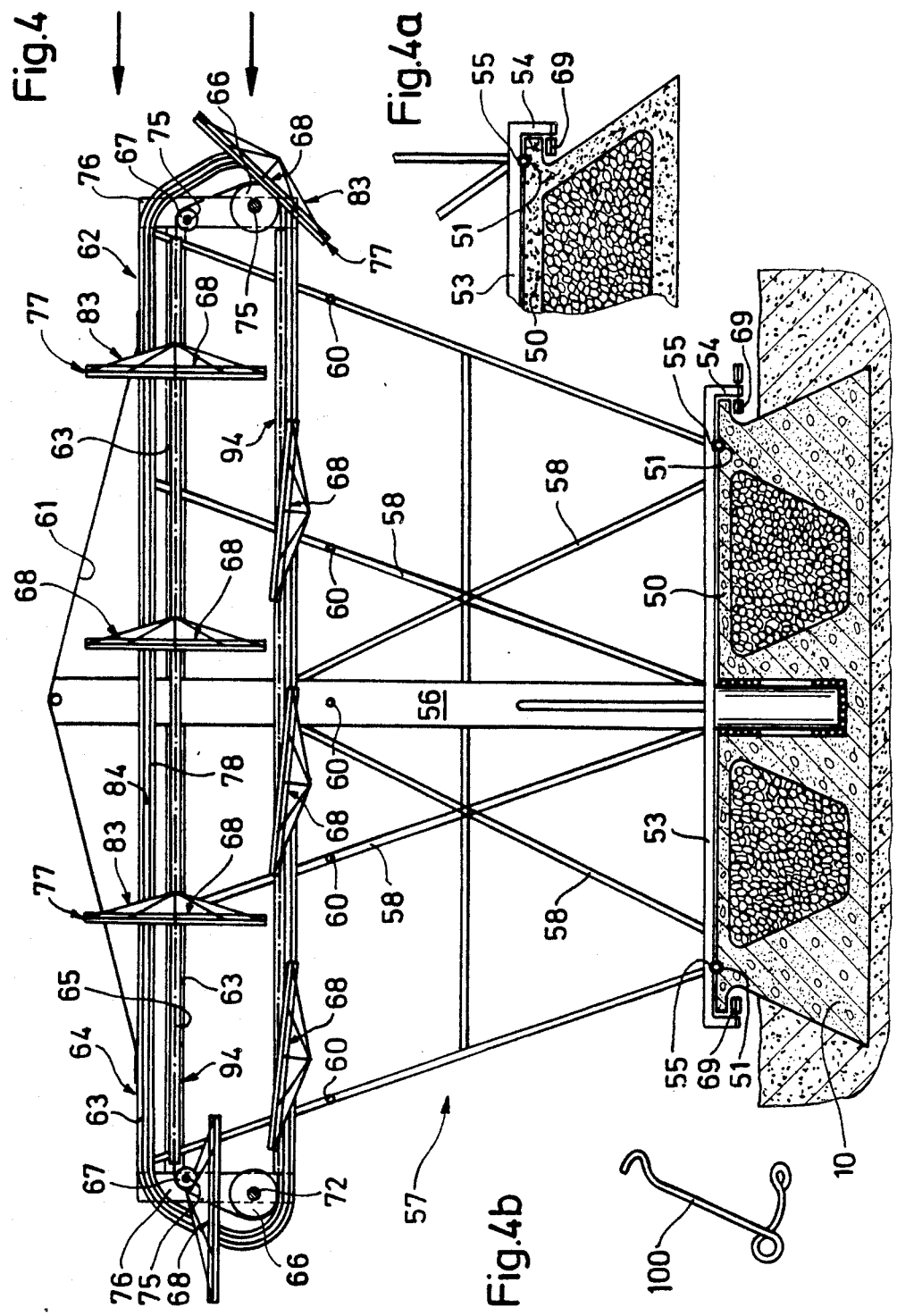
FIG. 4 is a diagrammatic front elevation of a modified wind power plant having a plurality of masts on a support plate and a plurality of sail surfaces in a longitudinal frame with guide pulleys.
Figure 5:
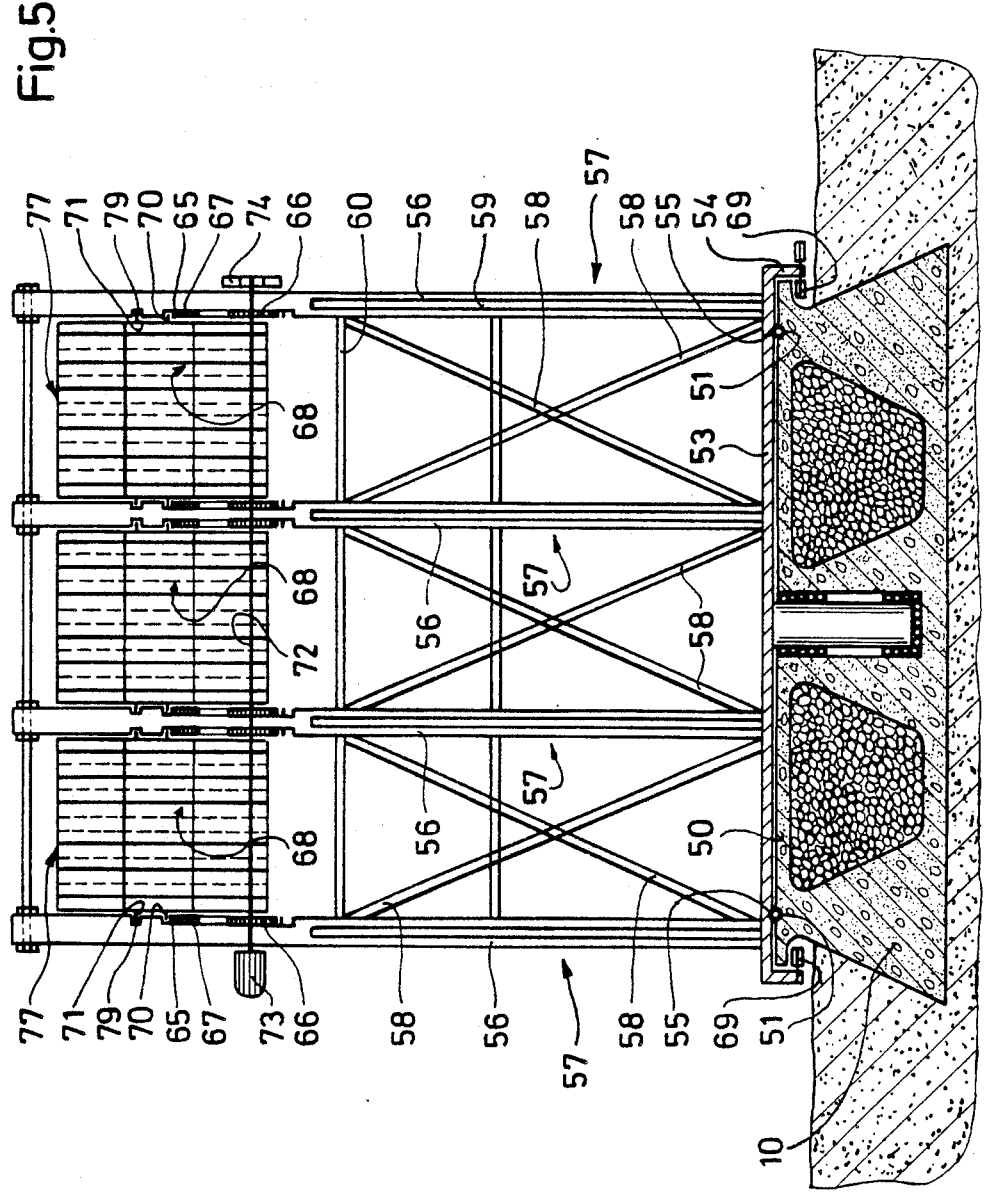
FIG. 5 is a front elevation of the same modified wind power plant of FIG. 4 with three frames and sail surfaces with reversal pulleys with a power shaft and lateral compensating flywheel with generator.
Figure 6:
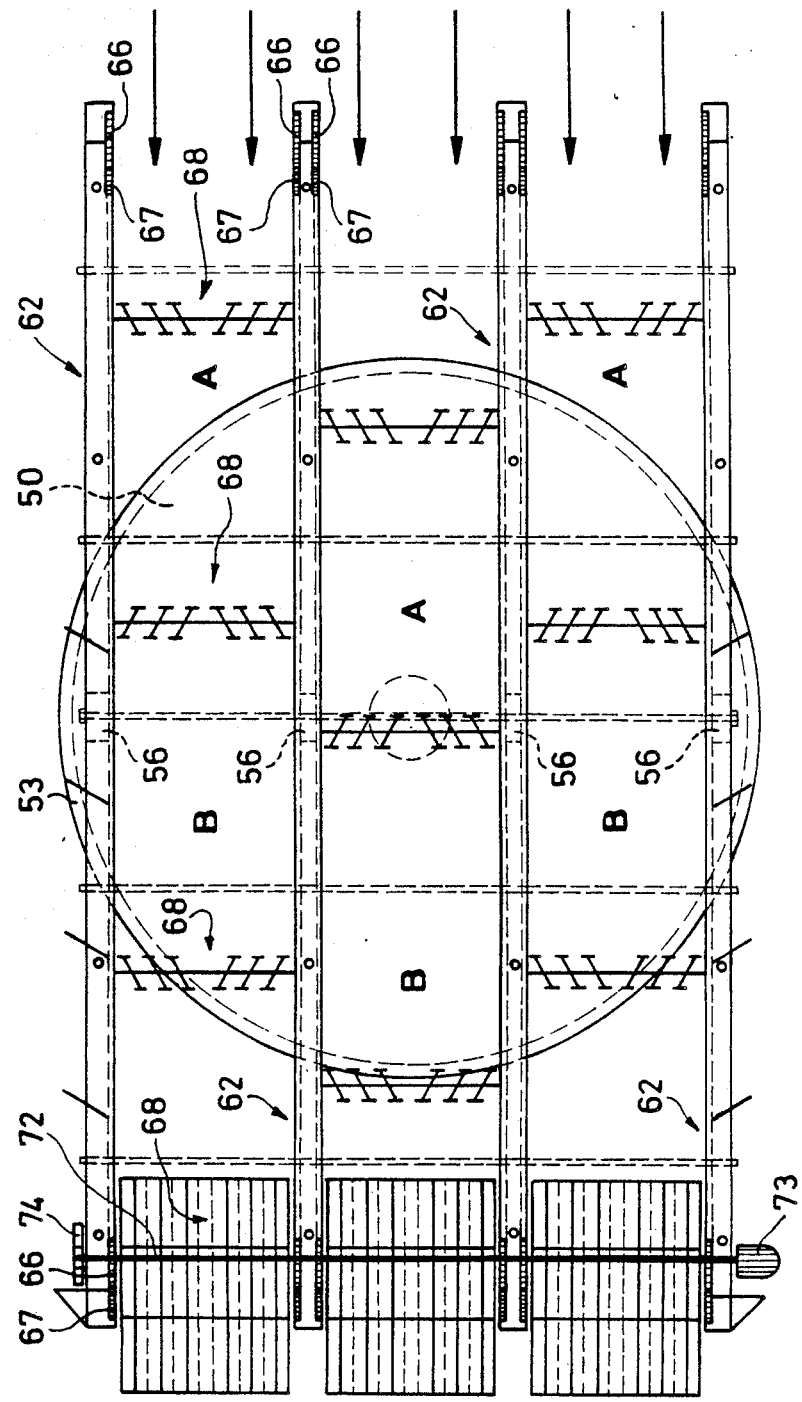
FIG. 6 is a plan view of an embodiment in accordance with FIG. 5 with angled, perpendicular sail surfaces in three air passages between the longitudinal frames.
Figure 7:
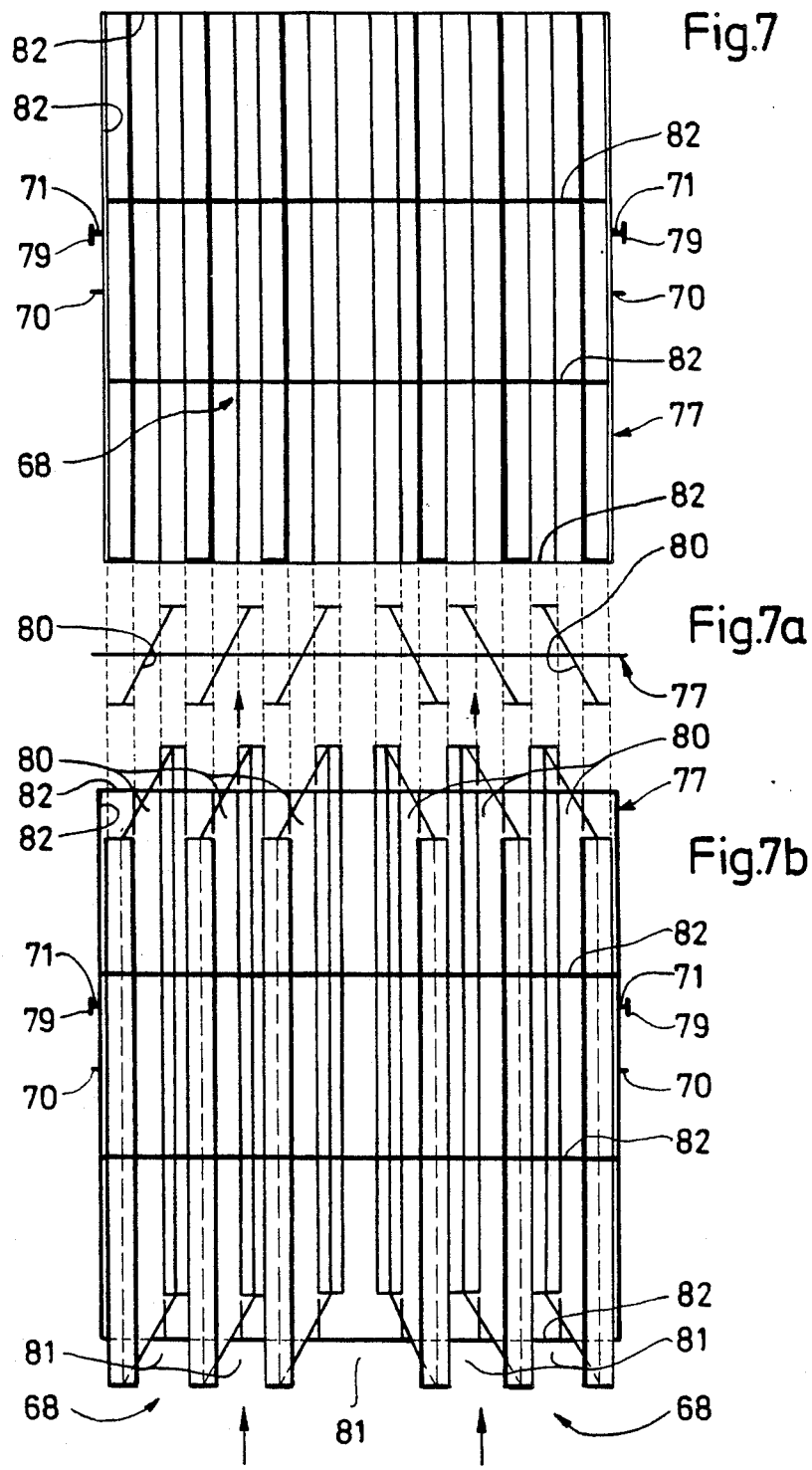

The mode of operation of a wind power plant shown in FIG. 4 will be described hereinafter. By way of example, the wind power plant illustrated as an embodiment has a total of 24 sail surfaces 68 on three tracks. In the operating phase illustrated, the nine sail surfaces 68 in a perpendicular position are displaced linearly in one direction (rearwardly) on one plane by the airflows and urge the pulling devices 65 on both sides in the upper run, such as chains, rearwardly, so that the rotary movements are transmitted to the rear guide pulleys 66, 67 and their continuous power shaft 72 and to the generator 73 and the compensating flywheel 64 by way of the front and rear, larger guide pulleys 66 and the smaller guide pulleys 67 located thereabove at a specific distance therefrom. The positions of the sail surfaces 68 dependent on operation at any given time are reached owing to the fact that the distance between the inner circulation rail 94 and the outer continuous guide groove 84 in the upper run of the wind power plant including the front and rear drops is entirely eliminated in the lower run of the plant.

Whilst the nine perpendicular sail surfaces 68 in the upper run of the plant are moving towards the rear guide pulleys 66, 67, six further sail surfaces 68, half of which are at the front end and half at the rear end of the plant, are in the descent-reversal phase and rising phase respectively, and a further nine sail surfaces 68 are moving in an almost horizontal position, that is, with low flow resistance, to the front, larger and smaller guide pulleys 66, 67 or back to the operating point.

The pulling lugs 70 on both sides of a respective sail surface 68 are hinged to the endlessly circulating pulling device 65, such as a chain, located in the circulation rail 94, wherein the guide lugs 71 disposed above the pulling lugs 70 engage the guide grooves 84 disposed on each side of the sail surface 68.

The oncoming, perpendicular sail surfaces 68 tilt through 90° from their perpendicular position into a horizontal position in the first instance at the rear, smaller guide pulleys 67. Upon further movement on the downwardly sloping guide, reversal through a further 177° takes place at the rear, larger guide pulleys 66, so that, after rotation has been completed, the sail surfaces 68 with a forward slope of 3°, that is, with low flow resistance, move in the lower run of the plant to the front, larger guide pulley 66 or to the operating point.

When the sail surface 68 has arrived at the operating point, it is first pulled by the pulling devices 65, or pushed by the guide lugs 71, into a sloping (forward) diagonal position raised at the top, and it is there picked up by the airflows on the path to the front, smaller guide pulleys 67.

The sail surface 68 is raised into the perpendicular position again by a further partial rotation at the smaller, front guide pulleys 67 and is acted upon by the wind again. A fresh cycle commences.

The airflow is first forced onto the lower rear half of the sail surface 68 at the transverse baffles 40 and, during the further course, onto the now temporary "upper front side", while, upon further reversal, the two halves smoothly pass through the favourable lee of the transverse baffle 40 with a short interruption. In these four phases of position, the reversal of the sail surface 68 is assisted to a considerable extent by the transverse baffle 40. This operation can also be safeguarded by the leading springs 100 (see FIG. 4b) which are preferably disposed on both sides of the each sail surface 68. The sail surfaces 68 on the centre track (A) have a characteristic of half the normal spacing of the sail surfaces 68 compared with the adjacent sail surfaces on the outer tracks (A), so that the airflow also acts upon the two outer sail surfaces 68 from the interior of the wind power plant.

All the sail surfaces 68 move on the individual tracks (A) between the adjacent front and rear guide pulleys 66, 67. They rotate, so to speak, about the power shaft 72 common to all of them and the transverse baffle 40 located therebelow, and do not touch the power shaft 72.

All the sail surfaces 68 go through the described operating sequences continuously, wherein they are connected by way of their pulling lugs 70, the lower, larger guide pulleys 66 and the smaller guide pulleys 67 located thereabove, and their pulling device 65 circulating thereabove, to a common power shaft 72 which is connected at one end to a compensating flywheel 74 and at its other end to a generator 73 which converts the rotary movements into energy.

The wind power plant can be readily protected against strong winds or hurricanes by turning it through 90° in a simple manner by means of an automatically controllable servo-motor (not illustrated), so that all the sail surfaces 68 and the transverse baffle 40 do not offer any, or only slight, lateral resistance to the airflows. All the parts of the wind power plant to be moved by the sail surfaces 68 engage the common power shaft 72 and move in synchronism.

It is possible to catch the airflows extensively with a large-area wind power plant of this kind, so that their kinetic and dynamic energy can then be converted to electrical energy by the generator 73.

Figure 8:
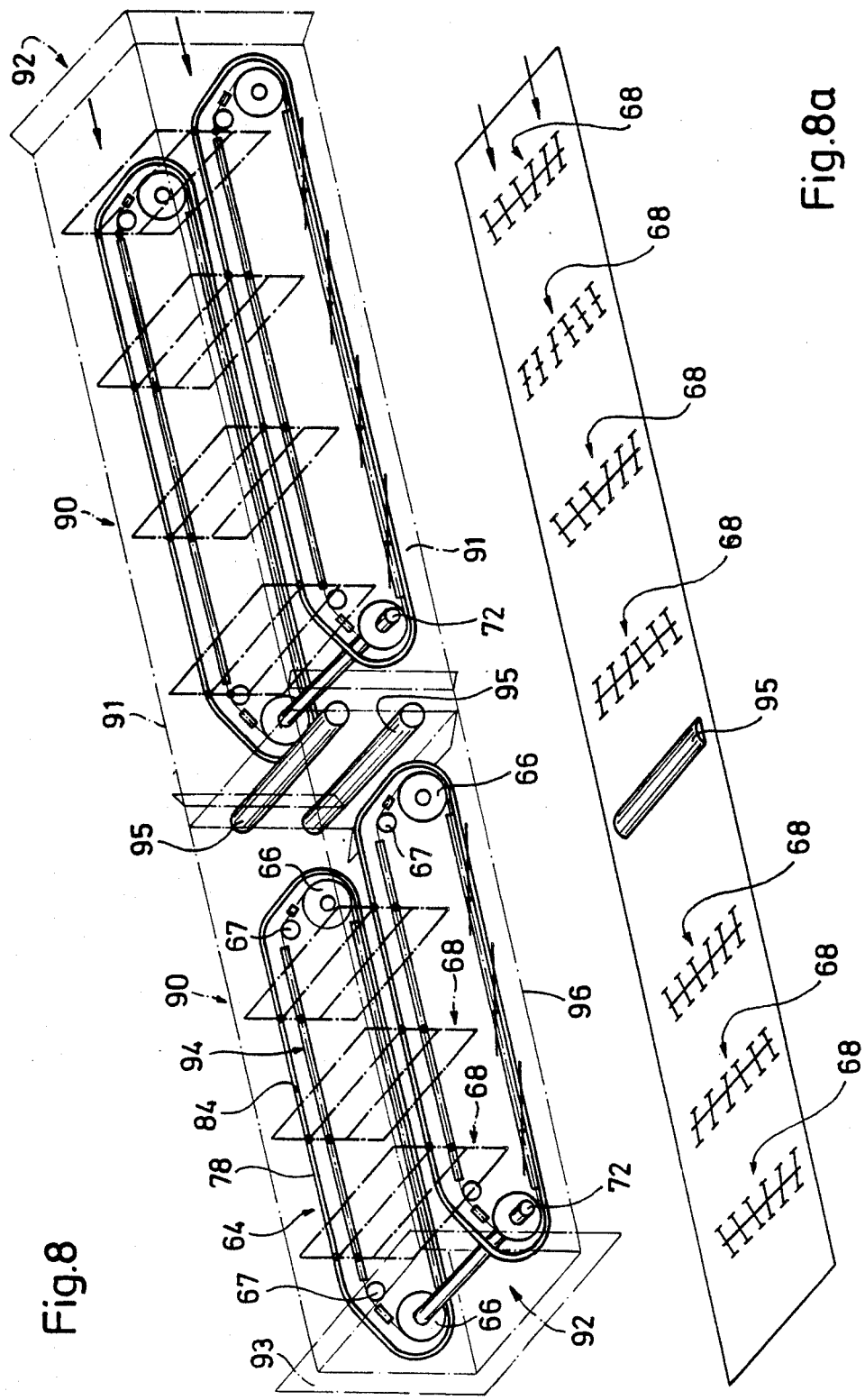
FIG. 8 is a perspective view of a wind power plant of FIG. 4 fitted in a tunnel, drawn to a smaller scale.

Preferably, two individual tracks (A) of a wind power plant on a smaller scale may be installed one behind the other in a tunnel 90 (FIG. 8). Wind propellers of cylindrical turbines (not illustrated) may be disposed in the centre between two tracks (A), the plant being covered on all sides by the surrounding walls 91 of the tunnel, although the front and rear openings 92 are open.

In this arrangement, wind vane baffle plates 93 of a size determined by operation are disposed at the rear end of the tunnel 90 and project at right angles from all outer edges. The said baffle plates cause a pressure buildup of the airflow at the end of the open tunnel and thereby increase the pressure gradient in the rear opening of the plant.

Openings with controllable air flaps (not illustrated) may be disposed on both ends and on the right-hand side in the tunnel walls 91 upstream of a wind turbine 95 and additionally ensure adequate flow quantities on the right-hand side upstream of the wind turbine in every operating phase.

By virtue of the natural suction in the tunnel 90, which can be boosted to a considerable extent by the wind turbine 95 disposed in the centre between the two tracks (A) disposed one behind the other, the airflow quantities are sucked, or forced by the wind turbine 95, onto the first right-hand wind surface of each track (A) and through the passages thereof, and continue to flow simultaneously and uniformly through the passages of all the following sail surfaces 68 and, in the passages themselves, strike peripherally with increased velocity fully against the perpendicular segment frames which are disposed at right angles to the direction of flow and which have the inner segment surfaces which, offset rearwardly, are secured in, for example, three groups.

Preferably, in the case of the tunnel construction, the second and third (or more) segment surfaces 80 are each disposed by half their width behind the one in front, so that the free space of all the passages in a sail surface is exactly the same size as the total segment frame surface therein.

This results in the advantage that the initial main flow has a free, unobstructed passage through all the sail surfaces 68 together with their passages, although its flow quantity is not decreased.

As a result of the continuous, gradual but always opposite change of direction of the passages in the adjacent sail surfaces 68 disposed one behind the other, the peripheral flow quantities always act upon the segment groups which, viewed in the downstream direction, are located on the left in the passages of the left-hand half of the track and on the right in the right hand half of the track, since the direction of the passages in the sail surfaces 68 forces a change in the direction of flow, and hence the flow quantities are centrifuged outwardly to the outer segment groups of a passage.

In this tunnel 90 also, the rear of the sail surface 68 in front is located in its own energy-promoting lee.

This lee is obtained owing to the passage direction and the increased velocities of the airflows in the passages, wherein the previous dynamic pressure of the following sail surface 68 is always fully built up again.

With this tunnel 90, the peripheral flow quantities, lying at the edge, of an airflow in the passage first encounter the first segment surfaces 80 of a group of segments and are deflected laterally. They are then caught by the main flow which forces them onto the second segment surface which is located half concealed behind the first.

The operation is repeated at the second segment surface, so that the third segment is also acted upon continuously and the main flow leaves the passage. This operation takes place continuously in all the passages, whilst the main flow quantities flow simultaneously and uniformly through all the sail surfaces 68 and their passages which are disposed in the entire plant.

In this construction of a tunnel 90, a bottom 96 is disposed below the bottom edges of all the vertical sail surfaces 68 over the entire length and breadth of the two tracks (FIG. 8), so that the flow quantities do not escape into the bottom region of the plant in which the horizontal sail surfaces move back to the operating point.

A baffle having a slope to the bottom 94 of the front track is disposed on the left of the lower wind turbine preferably to ensure that the airflows will be urged onto the sail surface 68 and will not escape into the lower part of the tunnel 90. The transverse baffle 40 can also be provided in this embodiment.

For functional reasons, the side walls of the tunnel 90 should be at a certain distance from the outer edges of the sail surfaces 68, so that the peripheral flow quantities, which have acted upon the outer segment surfaces 80 on each side, can escape to the respective outer wall of the tunnel 90 and can continue to flow along the wall to the rear.

A certain vacuum produced at the rear end of the rear track by a wind turbine 95 forces a suction or an airflow towards the wind turbine in the right-hand half of the tunnel as a result of the following natural atmospheric equalization of pressure, wherein the flow quantities of the wind turbine act peripherally upon all the segment surfaces 80 of all the sail surfaces 68 there, and hence the generator 73 supplies energy by means of the pulling devices 65 (etc.). The same also applies to the wind power plant which is disposed in front of the wind turbine 95 in the front half of the tunnel.

In this wind power plant, shown drawn to a reduced scale, in a tunnel 90, the operating sequences of all the movable parts of the system of the standard wind power plant first described are the same. Everything is disposed more compactly on only one track (A) in a tunnel. In this wind power plant also, the airflows encounter all the perpendicular sail surfaces 68 continuously, uniformly and simultaneously by means of the passages, and act peripherally upon the segment surfaces 80 in the passages themselves. The airflows are used in their entirety without reducing the quantity thereof in the passages, while a corresponding number of sail surfaces 68 at the same time move back to the operating point in a horizontal position.

The sail surfaces 68 may have the same area as the total segment surfaces therein, although their rearward stagger results in a ⅔ free space for the passages (B) in the sail surfaces 68.

This free space may be increased to 100% by staggering the 2nd and 3rd segment surfaces by half their width behind the one in front. Hence, the free space of all the passages (B) of a sail surface 68 is exactly the same size as the total surface in it. Double baffles 85 of wedge-shaped cross section may be disposed in the centre of all the passages and parallel to the segment surfaces. The tips of the double baffles are directed against the flow and conduct the latter to those sides of the segment surfaces which are to be acted upon. Viewed in the downwind direction, half the side to be acted upon is located in the passages (B) outwardly on the left, and half outwardly on the right.

As a result of the continuous, equal, but always opposed change of direction of the passages (B) in the adjacent sail surfaces 68 located one behind the other, the peripheral flow quantities always act upon the groups of three segments which, viewed in the downwind direction, are located in the passages (B) on the left in the left-hand half of the track and on the right in the right-hand half of the track, since the respective opposite direction of the passages (B) forces a change in the direction of flow, and hence the flow quantities are centrifuged outwardly onto the outer segment groups of each passage (B).

Since the entire passage surface of a wind surface is ⅓ smaller than its total segment surface, the velocities of the airflows in the passages (B) increase and always compensate for its previous quantities upstream of the following wind surface. In this connection, it must be taken into account that, from the centre line, the parts of the passage flow quantities which are directed outwards to the left and right act upon the segment surfaces located on the left and right respectively, while the total main quantity flows from one sail surface 68 to the following one without any appreciable resistance.

This operation is also assisted by the incoming flow quantities which are thrown in front of the following sail surfaces 68 by the air flowing past from the outside. As a result of the above constructions, it is possible to make the distances between the individual perpendicular sail surfaces 68 much smaller than if the sail surfaces 68 did not have any passages with their staggered segment surfaces.

The preferred arrangement of wind surfaces with built-in passages and rearwardly staggered segment surfaces combined in groups of three presents an advantageous possibility of operating a wind power plant which has a plurality of wind surfaces disposed one behind the other and adjacent to one another and which can be operated rationally in proportion to performance.

In a further preferred embodiment, three perpendicular wind surfaces staggered one behind the other may be disposed on each one of three tracks, wherein their pulling devices and the longitudinal frames carrying them may be secured to a plurality of central masts.

I claim:

1. A wind powered generating plant comprising:
   a support frame adapted to rotate around a generally vertical axis so as to maintain said plant in proper alignment with the prevailing wind;
   an air passage structure mounted on said support frame adapted to receive wind in one entry end and allow flow of said wind therethrough to an exit end;
   pulley means in said passage structure with endless chain means disposed on said pulley means for movement along the length of said passage structure in a direction generally parallel to the flow of wind through said passage structure;
   generating means connected to and driven by said pulley means;
   wind engaging members pivotally mounted on said chain means so as to move along the length of said passage structure under the force of the wind passing therethrough;
   guide means in said passage structure adapted to maintain said members generally orthogonal to the flow of air in the passage during movement with the wind so as to maximally engage the wind flow and further adapted to pivot said members generally parallel to the flow of air during movement against the wind; and
   a plurality of segment surfaces supported on said wind engaging members shaped to engage a portion of the wind flow so as to move said members, said chain means, and said pulley means, said segment surfaces mutually spaced from each other so as to enhance the conveyance of a portion of said wind flow therebetween and therearound and on to the subsequent wind engaging member in the air passage structure.

2. The wind powered plant of claim 1 in which said segment surfaces are angled slightly with respect to the prevailing flow of wind in said air passage structure.

3. The plant of claim 2 in which subsequent wind engaging members along the length of said passage structure have differently angled segment surfaces.

4. The plant of claim 1 including a boost turbine disposed centrally in said air passage structure.

5. The plant of claim 3 including a boost turbine disposed approximately in the middle of said air passage structure.

* * * * *